United States Patent [19]

Kristick et al.

[11] 4,035,780
[45] July 12, 1977

[54] PRIORITY INTERRUPT LOGIC CIRCUITS

[75] Inventors: Lawrence J. Kristick, Phoenix; Knute S. Crawford; Jaime Calle, both of Glendale, all of Ariz.

[73] Assignee: Honeywell Information Systems, Inc., Waltham, Mass.

[21] Appl. No.: 688,668

[22] Filed: May 21, 1976

[51] Int. Cl.² .................................... G06F 9/18
[52] U.S. Cl. ................................................ 364/900
[58] Field of Search .............................. 340/172.5

[56] References Cited
U.S. PATENT DOCUMENTS

| | | | |
|---|---|---|---|
| 3,863,225 | 1/1975 | Preiss | 340/172.5 |
| 3,889,237 | 6/1975 | Alferness et al. | 340/172.5 |

*Primary Examiner*—Gareth D. Shaw
*Assistant Examiner*—Thomas M. Heckler
*Attorney, Agent, or Firm*—Faith F. Driscoll; Nicholas Prasinos; Ronald T. Reiling

[57] ABSTRACT

Priority interrupt apparatus includes a level priority network, a plurality of priority networks, and selector circuits, each corresponding in number to the number of channel sources operative to generate interrupt requests. Each priority network receives requests signals corresponding to different types of possible event signals requiring attention and produces a type code designating the highest priority event from the channel associated therewith. The priority is established in accordance with a preassigned event priority approximating the priorities assignable by program. Each of the selector circuits is connected to receive as a control input the type code signals generated by the priority network associated therewith. Additionally, each selector circuit receives a different set of interrupt level number signals representative of priorities assigned by program to the number of possible event signals. In response to the request signals, the selector circuit of each channel source applies as an input to the level priority network the programmed designated set of interrupt level number signals specified by the type code signals. The level priority network includes a number of compare circuits and output gating circuits. Each compare circuit provides signal indications as to which one of a pair channels has the higher priority event as defined by the selected interrupt level signals. Signals indicating the results from each compare circuits are then applied to the output gating circuits which generate a code for selecting the type code and interrupt level signals of the channel source receiving the highest priority event.

25 Claims, 5 Drawing Figures

PRIORITY INTERRUPT LOGIC CIRCUITS

RELATED PATENT APPLICATIONS

1. "Programmable Interface Method and Apparatus," invented by Garvin Wesley Patterson, William A. Shelly, Earnest M. Monahan, and Jaime Calle, filed on Mar. 26, 1975, Ser. No. 562,364, now U.S. Pat. No. 4,006,466.

2. "Hardware Interrupt Mechanism," invented by Earnest M. Monahan, Garvin Wesley Patterson, and Jaime Calle, filed on Mar. 26, 1975, Ser. No. 562,315, now U.S. Pat. No. 4,001,783.

BACKGROUND OF THE PRESENT INVENTION

Field of Use

The present invention relates to priority processing and, more particularly, to apparatus for determining the highest priority interrupt from a number of sources.

Prior Art

In certain situations, it becomes necessary to establish the highest priority interrupt taking into account a number of different factors. These may relate to the interrupt priority assigned to the source or port generating the interrupt. Also, it may include, for purposes of flexibility, the examination of interrupt priority levels assigned under program control. Signals representative of other conditions may also require examination.

For the most part, the general approach has been to determine the priority of signals representative of each factor or condition separately by means of combinatorial logic circuits. Thereafter, the results are combined in further logic circuits to establish overall the highest priority interrupt requiring action.

It has been found that this approach requires a considerable amount of physical space to accommodate the required amount of logic circuits. Moreover, the physical space requirement increases substantially when sets of signals representative of several different factors or conditions may be taken into account in order to determine the interrupting source actually having the highest priority.

A further disadvantage of the prior art arrangements is that the successive comparisons introduce additional delays, thereby increasing the amount of time required to establish the highest priority interrupt. In an input/output system, it becomes important to be able to respond to interrupt requests within the shortest time possible for efficient processing. Thus, any additional delay in establishing which source has the highest priority reduces the overall efficiency of the input/output system.

Accordingly, it is a primary object of the present invention to provide interrupt priority processing apparatus which requires a minimum of logic circuits.

It is a further object of the present invention to provide interrupt priority apparatus capable of determining priority based upon a plurality of sets of signals representative of a plurality of different factors.

SUMMARY OF THE INVENTION

The above objects are achieved in a preferred embodiment of the present invention which comprises priority interrupt apparatus for processing interrupts from a plurality of channels or ports. The apparatus includes a compare level priority network coupled to a plurality of event priority networks and to a plurality of selector circuits. The event priority networks and selector circuits correspond in number to the number of channels or ports connected to generate interrupt requests.

The priority network of each channel is connected to receive a plurality of input signals, each representative of a different one of a number of types of events. In accordance with the present invention, each event priority network is connected to assign predetermined priorities to the different types of event signals corresponding to the interrupt priority level signals which would be assigned by program to the type of event. Sets of program assigned interrupt priority level signals are applied as inputs to the selector circuit associated therewith. In response to an interrupt request from a channel, the event priority network is operative to generate output type code signals designating the type of event having the highest priority. The type code signals are applied as a control input to the selector circuit associated therewith and select the set of program assigned interrupt level signals as an input to the compare level priority network for selection of the highest priority interrupt among the plurality of channels.

In accordance with the present invention, the compare level priority network includes a predetermined number of magnitude comparison circuits and an output circuit. Each comparison circuit is arranged to provide signal indications of the relative magnitudes of the sets of signals being compared. That is, each circuit has outputs indicating whether the compared signals are equal to, less than, or greater in magnitude than each other. Each generates a signal indication as to which one of a pair of channels has the higher priority event as defined by the program assigned interrupt priority level signals.

The signal indications of the results of the channel comparisons are logically combined in the output circuit in a manner to provide a code for selecting the type code signals and interrupt level signals associated with the channel having the highest priority event.

It should be noted that by preassigning priorities to the different types of event signals, the apparatus of the preferred embodiment eliminates the necessity for having to compare the program assigned interrupt priority level signals for each event within each channel. Because the preassigned priority for each type of event is made to approximate what should be the program assigned priority, interrupts are processed with the same efficiency as if such assignment were made by program.

The flexibility of the programmed assignment of interrupt priority levels is still retained by having compare circuits establish the channel having the highest priority by comparison of the program assigned interrupt priority level signals designed by the type code signals corresponding to the highest priority event generated by each event priority network.

Through the use of magnitude compare circuits, the channel having the highest priority event is ascertained with a minimum of delay since it is possible with such circuits to eliminate the need to make successive comparisons. By not having to make successive comparisons, the amount of circuits is reduced significantly.

Signals applied by the selector circuits as inputs to the compare circuits are effectively compared only when an interrupt request has been generated by the channel associated therewith. This eliminates the need for additional circuits required for enabling the different circuits included in the priority interrupt apparatus of the preferred embodiment of the present invention.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

DESCRIPTION OF THE PREFERRED EMBODIMENT

General Description

Figure 1:
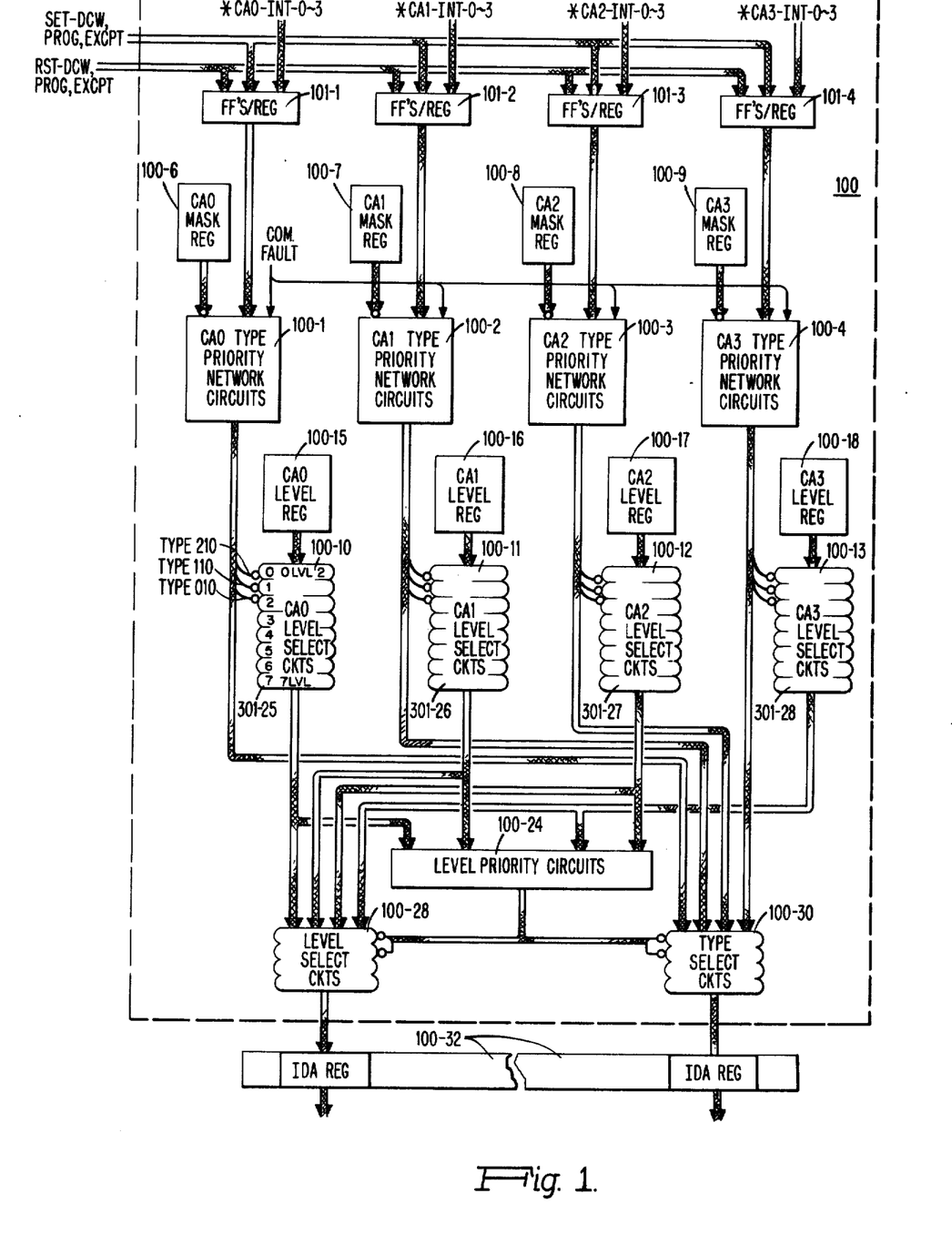
FIG. 1 is a block diagram of the priority interrupt apparatus of the present invention.

As seen from FIG. 1, the apparatus which incorporates the principles of the present invention includes a plurality of type priority networks 100–1 through 100–4. As seen from FIG. 1, each type priority network receives groups of interrupt request signals for a specific channel adapter (i.e., channel adapter 0 (CA0), channel adapter 1 (CA1), etc.). Additionally, each type priority network receives interrupt signals generated by controller adapters which are attached to the channel adapters. The arrangement of channel adapters is described in considerable detail in the related patent application "Programmable Interface Apparatus and Method," referenced in the introductory portion of the application.

However, for a complete understanding of the present invention, it is desirable to briefy discuss the types of interrupt requests processed by the apparatus of the present invention. More specifically, each CA channel can generate up to four different types of interrupt requests. They include a fault interrupt caused by the setting of a parity error indicator bit within a status register, a data control word (DCW) interrupt, a programmable interrupt, and an exception interrupt produced by the detection of an illegal command or other similar condition. The fault interrupt is common to each channel. Thus, this signal is applied as a single input to each of the type priority networks 100–1 through 100–4. The channel interrupts mentioned are applied via a corresponding one of the input registers 101–1 through 101–4. As seen from FIG. 1, the indications of these different types of interrupts are applied from these registers to corresponding ones of the type priority networks.

Each controller adapter can also generate four different types of interrupt requests which are dependent upon the type of device connected to the adapter. For example, in the case of a disk device, the types of interrupt requests include:

A fault interrupt caused by detection of parity errors;
A rotational position interrupt;
A data transfer termination interrupt; and,
An off-line interrupt caused by the completion of an off-line operation such as a seek operation.

These interrupt signals are applied as inputs to the registers 101–1 through 101–4 (i.e., CA0INT0 through 3).

The four types of channel interrupt requests and the four types of CA interrupt requests together provide a group of eight types per CA channel designated as events EV0 through EV7. Stated differently, each different type of interrupt request corresponds to the occurrence of a specific event. As explained herein in greater detail, each type of interrupt request is assigned a three bit type number such that the four channel types of interrupt requests are numbered 0–3 corresponding to EV0-14 EV3 while the four controller adapter types of interrupt requests are numbered 4–7 corresponding to EV4–EV7. As also explained herein, the events having the lowest codes have the highest priority.

As also seen from FIG. 1, each type priority type network receives signals from a mask register associated therewith. This corresponds to registers 100–6 through 100–9. As explained herein, the type priority networks combine the signals from corresponding ones of the mask registers with the interrupt request signals from each channel and adapter for selection of the interrupt request having the highest priority. Each type priority network generates a three bit type code for the channel associated therewith which is applied as an input to a corresponding one of the data selector circuits 100–10 through 100–13. Additionally, the type coded signals from each type priority network is applied as an input to a further selector circuit 100–30.

As seen from FIG. 1, each data selector circuit couples to a level register associated with the channel. These correspond to registers 100–15 through 100–18. Each of the level registers contains 24 bit positions. Groups of bit positions of each register are applied to a corresponding position of a different one of the data selector circuits 100–10 through 100–13. The level registers of the channels store a three bit code for each possible type of event signal. These registers are loaded by program and enable the system to modify the priorities accorded to different events during normal system operation. The manner in which these registers are loaded is described in considerable detail in the aforementioned patent application, "Programmable Interface Apparatus and Method."

As seen from FIG. 1, the output of each data selector circuit is applied to the level priority circuit 100–24. The circuit 100–24 is operative to generate output signals designating the channel or port having the highest priority event. In the case where more than one channel has the same priority level, the circuits 100–24 select the channel assigned the lowest channel number (i.e., CA0 = 00 equals highest priority, through CA3 = 11 equals lowest priority). The channel number output from circuit 100–24 is applied to the type selector circuit 100–30 and the level selects circuit 100–28. These signals condition these data selector circuits for directly applying the type and level signals representative of the channel having the highest priority event.

It is seen that the level signals and type signals selected are, in turn, applied as an input to a certain stage of a data register 100–32. These signals, together with other signals, are applied to the processing unit which is to respond to the interrupt request.

Detailed Description

Figure 2A:
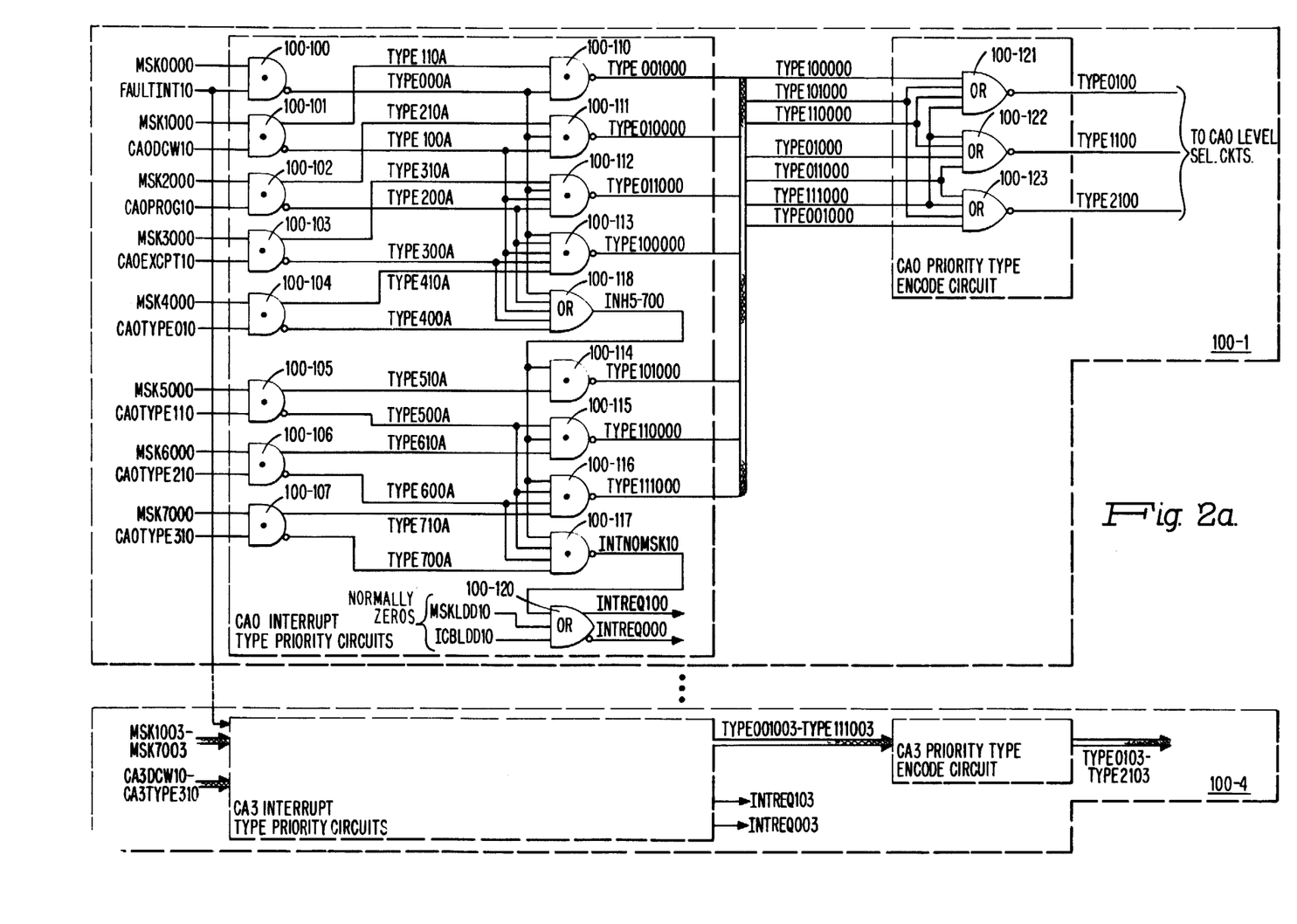
FIG. 2a through 2c show in greater detail the type priority network, level selection circuit, and level priority circuit of FIG. 1.
Figure 2B:
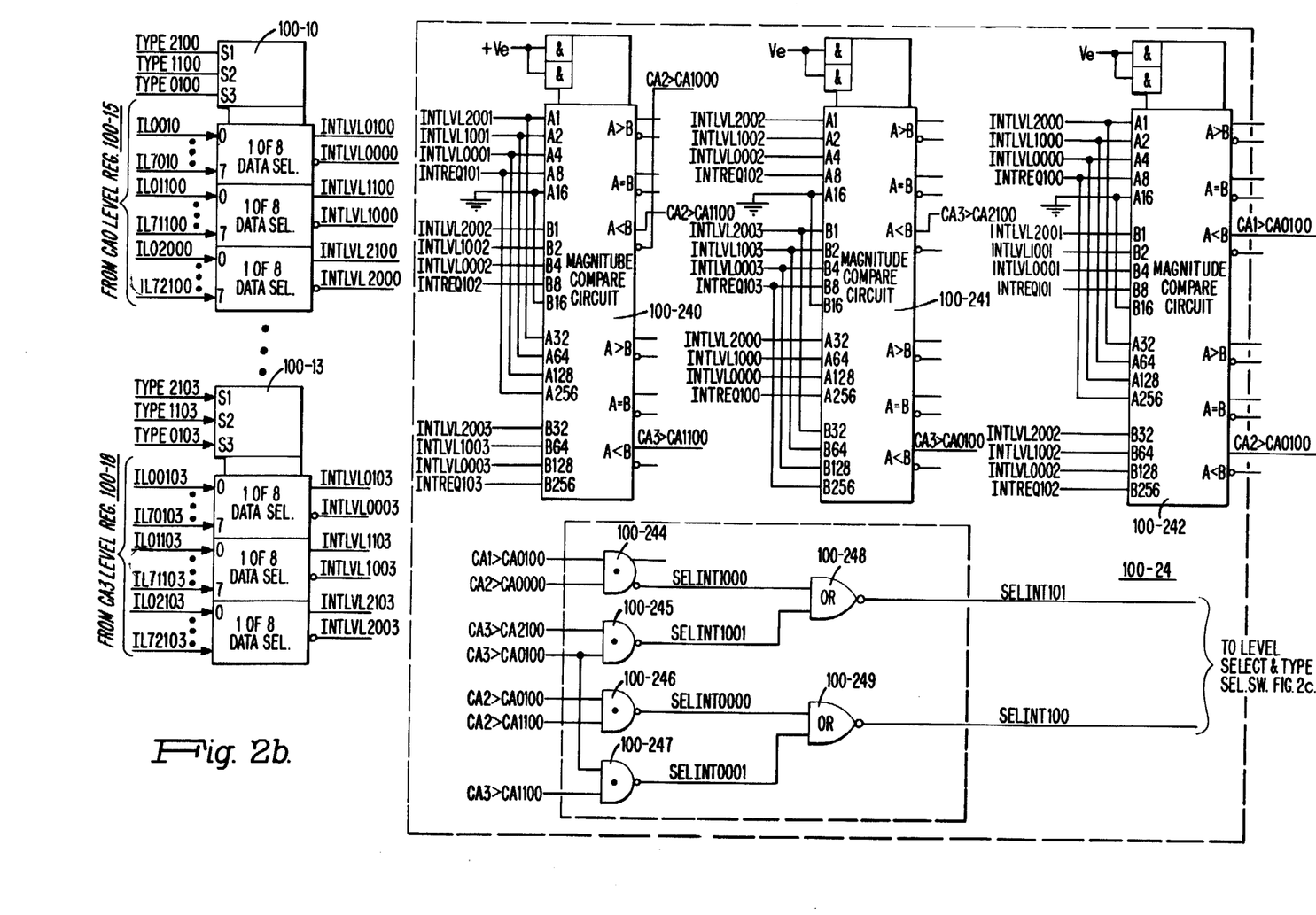
Figure 2C:
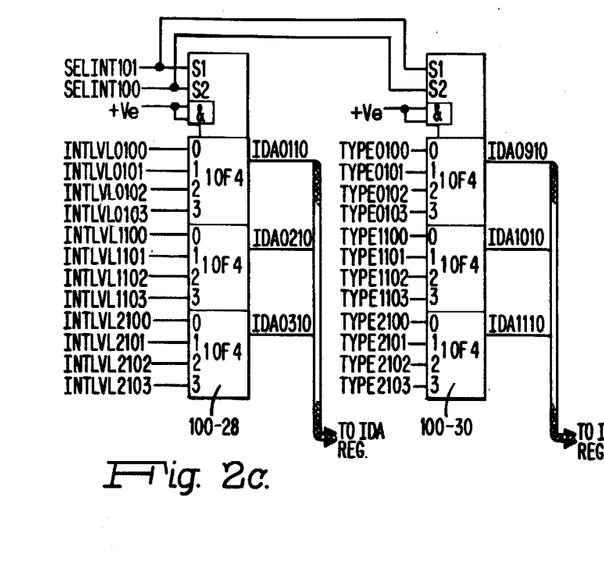

FIGS. 2a through 2c show in greater detail the different ones of the blocks of FIG. 1. For example, referring in FIG. 2a, it is seen that each type priority network comprises a plurality of AND/NAND circuits which are connected to combine the interrupt request signals from the channel and controller adapter. The results of combining these signals are applied as inputs to a priority type encoder circuit included within the type priority network. This circuit converts the input signal representative of a type of event into a three bit code. Since the priority network for each channel is constructed in a similar fashion, only the type priority network for channel CA0 is shown in detail in FIG. 2a.

Considering FIG. 2a in greater detail, it is seen that the fault interrupt signals and other event signals are logically combined with a mask input which determines whether or not that event signal will be responded to by the system. The order of signals applied to AND/NAND gates 100—100 through 100-107 establishes the predetermined order of priority. It is seen that the fault interrupt signal designated FAULTINT10 is accorded the highest priority while signal CA0TYPE310 is accorded the lowest priority. The NAND gates 100-110 through 100-117 logically combine the signals indicative of other events in the manner shown. Signals representative of type 0 through type 4 interrupt requests are applied to an OR circuit 100-118. The output of the OR circuit is applied to the next group of three gates and the result is that the presence of a type 0 through type 4 interrupt request is effective to inhibit interrupt types 5 through 7 from being processed. A last OR gate 100-120 forces an interrupt request signal INTREQ100 in response to one of the event interrupt signals being present.

The different ones of the possible type signals (TYPE001000 through TYPE111000) are encoded into an appropriate three bit code defined by signals TYPE0100 through TYPE2100. The encoding is done such that the highest priority signal TYPE00100 causes the encoder circuit, which comprises NOR gates 100-121 through 100-123, to generate a type code of 001. Similarly, the signal TYPE111000 causes the same circuits to generate a type code of 111.

In accordance with the present invention, the channel interrupt request signals corresponding to FAULTINT10 through CA0EXCPT10 for channel CA0 have been preassigned priorities which would correspond to program assigned priorities, thereby eliminating the need for examining the program assigned interrupt levels. Thus, this made it possible to use the type assignments directly to determine priority in the situation where a single channel has more than one event signal present. By examining the various types of events, it was determined that the event accorded the first priority (type 0) should be the fault interrupt event. The next highest priority (type 1) was assigned to the data control word interrupts signaling the need of a new Data Control Word. As concerns the exception type event and the programmable interrupt event, it was determined that the program would utilize the programmable interrupt as a higher priority event. Therefore, the programmable interrupt event was assigned type 2 priority while the exception event was assigned type 3. By carefully selecting the priorities in this manner, interrupt processing is able to proceed in an efficient manner notwithstanding the fixed priority assignments.

Referring to FIG. 2b, it is seen that each of the data selector circuits 100-10 through 100-13 includes up to three sections. Each section receives different sets of the 24 bit positions of the level register such that selection of all sections results in a three bit interrupt level code being applied to the output of data selector 100-10. In each case, the three section data selection circuits are enabled in response to the type signals applied to inputs S1, S2, and S3 of the circuit. Thus, the appropriate interrupt level code is selected in accordance with the state of the type signals applied to inputs S1 through S3.

The selected interrupt levels from each of the circuits 100-10 through 100-13 are applied to different ones of the three compare circuits 100-240 through 100-242. Additionally, each of the compare circuits 100-240 through 100-242 receives interrupt request signals from the circuits of FIG. 2a. Each comparison circuit performs the following magnitude comparisons between two groups of data fields. The circuit establishes whether Field A is less in magnitude than Field B, is equal in magnitude to Field B, or is greater in magnitude than Field B. It will be appreciated that, for the purposes of the present invention, each compare circuit may be constructed using conventional circuits such as those disclosed in the publication "The Integrated Circuits Catalog for Design Engineers," by Texas Instruments, Inc., printed in 1972. However, a preferred form of the compare circuit is shown in block diagram form in FIG. 3. Referring to that figure, it is seen that the compare circuit is constructed from a number of half-adder circuits. Each half-adder circuit receives one bit of each field (i.e., A1, B1). The half-adder circuit provides the appropriate signal indications based on whether the pair of bits is greater than, equal to, or less than the other bit. The results of each adder circuit are combined in a group of AND circuits to produce the final result indicating whether Field A is greater than, equal to, or less than Field B. For further information regarding the operation of the half-adder circuits and their implementation using current mode logic circuits, reference may be made to the copending applications of Homer W. Miller entitled "Carry Mode Carry Save Adder" and "Current Mode Arithmetic Logic Array," bearing Ser. No. 618,709 and Ser. No. 562,316, now U.S. Pat. No. 3,925,651, respectively. Reference is also made to U.S. Pat. No. 3,955,177.

Figure 3:
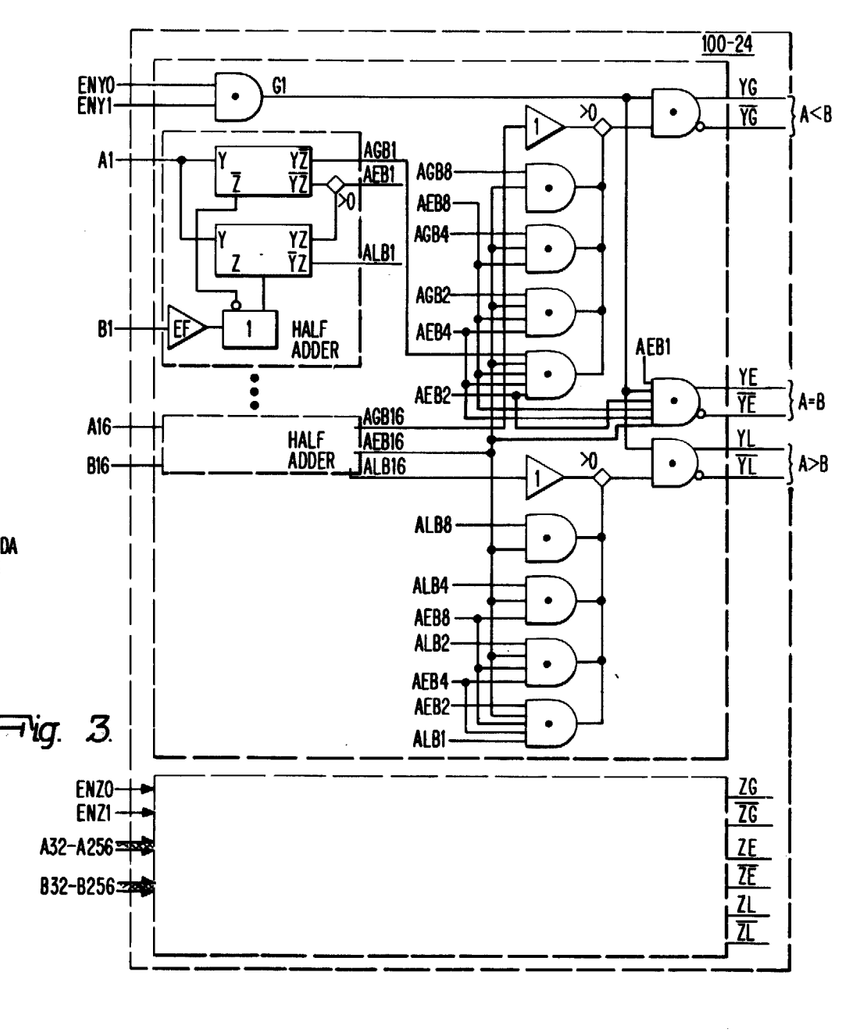
FIG. 3 shows in greater detail, an example of one type of magnitude compare circuit included in the priority level circuit of FIG. 2b. de

It will be noted that bits A8 and B8 receive the interrupt request signals from the channel associated therewith. By connecting the interrupt request signals as shown, this produces the appropriate output signals for a given comparison only when a channel has an interrupt requested. Accordingly, there is no additional logic required for enabling the comparator circuits thereby reducing the amount of space required for the priority apparatus of the present invention.

The output signal indications from the A less than B output of each comparator circuit are applied as inputs to a set of NAND gates 100-244 through 100-247. The NAND signals are, in turn, applied to a pair of NOR gates 100-248 and 100-249. The gating arrangement effectively ANDs the output of the compare circuits and provides a pair of signals for selecting which of the four channels has the highest interrupt event at the time. These signals, SELINT101 and SELINT100, are applied to the level select circuit 100-28 and type select circuit 100-30, as shown in FIG. 1. The circuits, which are shown in greater detail in FIG. 2c, comprise a three section one of four data selector circuits. Each of these circuits receives the SELINT101 and SELINT100 signals as a control input for selecting the interrupt levels and type code of the channel having the highest priority event requiring attention.

DESCRIPTION OF OPERATION

With reference to FIGS. 1 through 3, the operation of the apparatus of the present invention will now be described with reference to a specific example. It is assumed by way of example that the circuits of channel CA0 receive an exception type signal indicating the occurrence of a violation such as an attempted access to privileged information. Concurrent therewith, it is assumed that channel CA3 also has applied a pair of signals indicating exhausiton of data control words and the occurrence of a programmable condition. The other channels do not have event signals applied at this time.

It will be noted that while channel CA0 has priority over channel CA3, channel CA0 interrupt event signal is requesting an interrupt which is lower in priority than either interrupt request from channel CA3. Thus, for efficient operation and speed, it is important that the highest priority event be given priority and that priority resolution be carried out expeditiously.

Referring to FIG. 2a, it is seen that, in the case of channel CA0, signal CA0EXCPT10 is forced to a binary ONE. Signals CA3DCW10 and CA3PROG10 applied to channel CA3 are both binary 1. In response to signal CA0EXCPT10, the CA0 interrupt type priority circuits 100-1 force signal TYPE011000 to a binary 0, signaling the occurrence of the type 3 interrupt. This, in turn, conditions the CA0 priority type encode circuits to force signals TYPE0100 through TYPE2100 to a code of 011. In response to signals CA3DCW10 and CA3PROG10, the CA3 interrupt type priority circuits 100-4 force signal TYPE001003 to a binary 0, signaling the type of event having the higher priority. This, in turn, conditions the CA3 priority type encode circuits to force signals TYPE0103 through TYPE2103 to a code of 001.

As seen from FIG. 2a, the type codes of 011 and 001 from channels CA0 and CA3, respectively, are applied to corresponding ones of the level selection circuits (i.e., 100-10 and 100-13) of FIG. 2b. Because of the preassigned priority given to the different type of events, the program assigned priority levels normally will be the same as the type code. Thus, in the present example, the type codes of 011 and 001 when applied to the selection inputs of data selector circuits 100-10 and 100-13 produce at the outputs interrupt level codes of 011 and 001, respectively.

As seen from FIG. 2b, the codes are applied as inputs to compare circuits 100-240 and 100-241. It will be noted that it is only those channels which receive an event signal which generate an interrupt request. That is, channel CA0 forces signal INTREQ100 to a binary 1 while channel CA3 forces signal INTREQ103 to a binary 1. Each of the request signals is applied as the most significant bit input. Thus, comparisons in magnitude of interrupt level signals are, in effect, made between only those channels which have the interrupt request set to a binary 1. That is, those channels which do not have the interrupt request set to a binary 1 will always be less in magnitude than the channel having its interrupt request set to a binary 1.

In the present example, since channel CA3 has a higher priority request that channel CA0, compare circuit 100-241 forces signal CA3>CA0100 to a binary 1. Also, signals CA3>CA2100 and CA3->CA1100 are forced to binary 1 because channel CA3 has an interrupt request set. Similarly, because channel CA0 has an interrupt request set, the compare circuit 100-242 forces signals CA1>CA0100 and CA2->CA0100 to binary 0. Concerning the other channels with no interrupt request set, the interrupt level signals are the same (i.e., binary 0). Therefore, the highest priority channel is designated by the compare circuits. That is, signal CA2>CA1000 is a binary 1 (channel CA1 is higher in priority than channel CA2) while signal CA2>CA1100 is a binary 0.

The output signals indicative of the relative magnitude between the various channels are applied to the output gates 100-244 through 100-249 of FIG. 2b. In the present example, the pairs of signals applied to gates 100-245 and 100-247 are binary 1. This causes signals SELINT1001 and SELINT0001 to be forced to binary 0. This, in turn, forces the selection signals SELINT101 and SELINT100 to a code of 11. Since this code directly identifies channel CA3 as having the highest priority request, the signals, when applied to the selection circuits 100-28 and 100-30, result in applying the interrupt level signals and type code signals of channel CA3 as inputs to the IDA register 100-32 of FIG. 1.

From the above example, it can be seen that the apparatus of the present invention provides for efficient resolution of interrupts produced by the occurrence of different types of events. By preassigning priorities to the different types of events within each channel, it becomes necessary only to comprare interrupt level signals assigned by program between channels. In accordance with the present invention, a minimum number of magnitude compare circuits are used to determine the channel having the highest priority interrupt. When two or more channels have the same priority, the compare circuits automatically select the highest priority channel (i.e., CA0 through CA3). By resolving priorities using the magnitude compare circuits, the apparatus of the present invention minimizes the amount of time required.

While in the example given it was assumed that the type priority levels and interrupt level signals were the same, it will be appreciated that these can be altered under program control, thereby providing the same degree of flexibility notwithstanding the preassignment of type event signals within a channel. Moreover, the preassignment of type event signals can also be modified to accommodate the connection of special types of devices to a channel. It will be obvious to those skilled in the art that other modifications can be made to the apparatus of the present invention.

While in accordance with the provisions and statutes there has been illustrated and described the best form of the invention known, certain changes may be made to the system described without departing from the spirit of the invention as set forth in the appended claims and, in some cases, certain features of the invention may be used to advantage without a corresponding use of other features.

What is claimed is:
1. Priority interrupt apparatus comprising:

register means for storing sets of coded signals representative of priority interrupt levels assigned to a number of different types of events;

a number of fixed priority logic means, each connected to receive a plurality of input event signals representative of said different types of events, each said fixed priority logic means being operative in response to more than one event signal to generate coded signals identifying the type of event signal having the highest priority in accordance with a predetermined fixed priority based on event type;

a number of level selector means, each being connected to receive a plurality of sets of interrupt level signals from said register means and said type signals from a different one of said number of fixed priority logic means, each said selector means being conditioned by said type signals to apply one of said sets designated by said type signals as an output;

comparator circuit means having a plurality of groups of input terminals, each group connected to one of said selector means and a plurality of output terminals, said comparator circuit means generating result output signals at said plurality of output terminals indicative of the relative magnitudes of pairs of said sets of signals applied to said groups of input terminals; and output circuit means coupled to receive said result output signals, said output circuit means including means for logically combining said result output signals to generate output signals for designating the source of interrupt level signals of the highest priority event.

2. The apparatus of claim 1, wherein each of said number of fixed priority logic means includes means connected to establish said predetermined fixed priority in accordance with preassigned priorities based upon event type to approximate the priorities normally assigned in processing each different type of event.

3. The apparatus of claim 2, wherein said apparatus further includes:

output selector means including output terminals, control terminals, and a plurality of sets of input terminals equal in number to said number of level selector means, each set being connected to a different one of said number of level selector means and said control terminals being connected to said output circuit means, said output selector means being conditioned by said output signals to apply said set of interrupt level signals to said output terminals.

4. The apparatus of claim 2 wherein each set of priority interrupt level signals is coded in binary and wherein said comparator circuit means includes:

a number of magnitude compare circuits, said number being less than twice the number of level selector means, each of said magnitude compare circuits including a number of adder circuits being connected to said groups of input terminals for receiving a pair of said binary coded priority interrupt level signals, said number of adder circuits generating said result signals by performing arithmetic operations upon said signals for indicating which one of said pair of greater and less in magnitude.

5. The apparatus of claim 4, wherein said means of each fixed priority logic means includes logic gating means for generating an interrupt request signal in response to receiving any one of said input event signals and wherein a predetermined one of each said group of input terminals of each said magnitude compare circuit is connected to receive said interrupt request signal from said logic gating means of one of said fixed priority logic means and one of said number of adder circuits being enabled by said interrupt request signal to generate said output result signals in accordance with the magnitude of said groups of binary coded priority interrupt level signals.

6. The apparatus of claim 5 wherein said predetermined one of each said group of input terminals corresponds to one of the binary coded signals assigned the highest numerical value.

7. The apparatus of claim 3 wherein said apparatus further includes:

type selector means including output terminals, control terminals, and a plurality of sets of input terminals, each set of input terminals being equal in number to said number of fixed priority logic means, each set being connected to said output terminals of a different one of said number of fixed priority logic means and said control terminals being connected to said output circuit means, said type selector means being conditioned by said output signals to apply to said output terminals type signals from one of said number of fixed priority logic means designated by said output signals.

8. The apparatus of claim 7 wherein said means of each of said number of fixed priority logic means further includes:

a first number of gate circuits, each connected to receive a different predetermined one of said event signals;

a second number of gate circuits, each having an output terminal and a plurality of input terminals connected to a plurality of said first number of gate circuits each gate circuit being operative to decode said event signals in accordance with said predetermined fixed priority to produce an output signal at said output terminal identifying the highest priority event signal received by said fixed priority logic means; and, an encoder circuit connected to said output terminal of each of said second number of gate circuits, said encoder circuit being operative in response to said output signal to generate said type signals coded to identify said highest priority event signal.

9. The apparatus of claim 8 wherein said means of each of said fixed priority logic means has a first one of said first number of gate circuits connected to receive an event signal indicative of a fault associated with any one of a number of input/output devices, a second one of said first number of gate circuits connected to receive an event signal indicative of requiring additional control information, a third one of said first number of gate circuits connected to receive an event signal indicative of a programmable condition, and a fourth one of said first number of gate circuits connected to receive an event signal indicative of an exception condition.

10. The apparatus of claim 9 wherein said first, second, third, and fourth gate circuits in response to a corresponding one of said event signals condition said encoder circuit to generate said type signals coded in binary to have values 000 through 011 corresponding to the highest to lowest priority event, respectively.

11. The apparatus of claim 10 wherein said priority interrupt level signals are coded in binary to have values 000 through 111 corresponding to the highest to lowest priority, respectively.

12. The apparatus according to claim 11 wherein each of said number of fixed priority logic means is connected to receive said event signals from a corresponding number of channels CA0 through CA3 and wherein said result signals indicate the relative magnitude of priorities of said event signals between parts of said channels as follows:
CA1 greater than CA0;
CA2 greater than CA1;
CA3 greater than CA2;
CA3 greater than CA0;
CA2 greater than CA0;
CA2 less than CA0; and,
CA3 greater than CA1.

13. The apparatus according to claim 12 wherein said output circuit means includes a first plurality of gate circuits, each connected to receive pairs of said result signals and a second plurality of gate circuits, each connected to a predetermined pair of said first plurality of gate circuits, and second plurality of gate circuits being conditioned by signals from said first plurality of gate circuits to generate said control signals for indicating which one of said channels CA0 through CA3 has the highest priority event.

14. The apparatus of claim 13 wherein said first and second plurality of gate circuits of each of said number of priority logic means and said first plurality of gate circuits of said output circuit means are NAND gate circuits.

15. A priority interrupt system for processing events, said system comrprising:
a plurality of registers, each storing sets of binary coded signals representative of priority interrupt levels which can be assigned to said events;
a plurality of fixed priority networks corresponding in number to said plurality of registers, each of said fixed priority networks being connected to receive a plurality of input event signals, each said network being operative in response to more than one event signal to generate coded type signals identifying the event having the highest priority in accordance with a preassigned priority;
a plurality of selector circuits corresponding in number to said plurality of registers, each said selector circuit being connected to a different one of said plurality of registers and including a plurality of output terminals, a plurality of sets of input terminals, each set of input terminals being connected to receive a different one of said sets of binary coded signals from said register associated therewith and a set of control input terminals for receiving said type signals;
a plurality of comparator circuits, each having a plurality of groups of input terminals, each group connected to said plurality of output terminals of a predetermined one of said selector circuits and a plurality of output terminals, each said comparator circuit generating result output signals at different ones of said plurality of output terminals indicative of the relative magnitudes of pairs of said sets of priority level signals selected for application to said groups of input terminals; and,
a plurality of gating circuits connected to different ones of said plurality of output terminals of said plurality of comparator circuits, said plurality of gating circuits selectively combining said result output signals for generating output signals coded to designate which one of said plurality of selector circuits and fixed priority networks are to provide said interrupt level signals and type of the highest priority event.

16. The system of claim 15 wherein each of said number of fixed priority logic networks includes a plurality of logic circuits interconnected to establish said predetermined fixed priority in accordance with preassigned priorities based upon the priorities normally assigned in processing each different type of event.

17. The system of claim 16 wherein each of said comparator circuits includes a number of adder circuits, each being connected to a pair of said groups of input terminals for receiving a bit pair of said interrupt level signals, said number of circuits generating said result signals by performing arithmetic operations upon said signals for indicating which one of said pair is greater and less in magnitude than the other.

18. The system of claim 17 wherein each of said fixed priority logic networks further includes logic gating means for generating an interrupt request signal in response to receiving any one of said event signals and wherein a predetermined one of each said group of input terminals of each said comparator circuit is connected to receive said interrupt request signal from said logic gating means of one of said fixed priority logic networks and one of said number of adder circuits being conditioned by said interrupt request signal to generate said output result signals in accordance with the magnitude of said sets of binary coded interrupt level signals.

19. The system of claim 18 wherein said system further includes:
a level selector circuit including output terminals, control terminals, and a plurality of sets of input terminals, each set being connected to a different one of said selector circuits and said control terminals being connected to receive said output signals from said plurality of gating circuits, said level selector circuit being conditioned by said output signals to apply a designated set of interrupt level signals to said output terminals.

20. The system of claim 19 wherein said system further includes:
a type selector circuit including output terminals, control terminals, and a plurality of sets of input terminals, each set being connected to said output terminals of a different one of said fixed priority logic networks and said control terminals being connected to receive said output signals from said plurality of gating circuits, said type selector circuit being conditioned by said output signals to apply a designated set of type signals to said output terminals.

21. A priority interrupt system for processing events received from a plurality of channels, CA0 through CAn where n equals a positive integer, said system comprising:
n number of registers, each storing a plurality of sets of binary coded signals representative of priority interrupt levels assigned to said events and modifiable during the processing of said events;
n number of fixed priority networks, each of said fixed priority networks being connected to receive a plurality of input event signals from a different one of said channels and each said network being operative in response to more than one event signal to generate type signals coded to identify the event signal having the highest priority based upon an anticipated preassigned priority;
- n number of multiposition selector circuits, each said selector circuit being connected to a different one of said number of registers and including a plurality of output terminals, a plurality of sets of input terminals, each set of input terminals being connected to receive a different one of said plurality of sets of binary coded signals from said different register and a set of control input terminals for receiving said type coded signals;
- a plurality of comparator circuits, each having a plurality of groups of input terminals, each group connected to said plurality of output terminals of a predetermined one of said selector circuits and a plurality of output terminals, each said comparator circuit generating result output signals at different ones of said plurality of output terminals indicative of the relative magnitudes of pairs of said sets of priority level signals selectively applied to said groups of input terminals; and,
- a plurality of output gate circuits connected to different ones of said plurality of comparator circuits, said plurality of gate circuits selectively combining said result output signals for generating output signals coded to designate which one of said channels has the highest priority event.

22. The system of claim 21 wherein each of said fixed priority networks includes a plurality of logic circuits interconnected to establish said predetermined fixed priority in accordance with preassigned priorities based upon the priorities normally assigned in processing each different type of event.

23. The system of claim 22 wherein each of said comparator circuits includes a number of adder circuits, each being connected to a pair of said groups of input terminals for receiving a bit pair of said interrupt level signals, said number of circuits generating said result signals by performing arithmetic operations upon said signals for indicating which one of said pair is greater and less in magnitude than the other of said pair.

24. The system of claim 23 wherein each of said fixed priority logic network further includes logic gating means for generating an interrupt request signal in response to receiving any one of said event signals and wherein a predetermined one of each group of input terminals of each said comparator circuit is connected to receive said interrupt request signal from said logic gating means of one of said fixed priority logic networks and one of said number of adder circuits being conditioned by said interrupt request signal to generate said output result signals in accordance with the magnitude of said sets of binary coded interrupt level signals.

25. The system of claim 24 wherein $n$ equals 3 and said result signals indicate the relative magnitude of priorities of said event signals between pairs of said channels as follows:

CA1 greater than CA0;
CA2 greater than CA0;
CA3 greater than CA0;
CA2 greater than CA1;
CA3 greater than CA1;
CA3 greater than CA2; and,
CA2 less than CA1.

* * * * *